United States Patent [19]

Nakajima et al.

[11] Patent Number: 4,731,208

[45] Date of Patent: Mar. 15, 1988

[54] METHOD OF REMOVING BINDER MATERIAL FROM A SHAPED CERAMIC PREFORM BY EXTRACTING WITH SUPERCRITICAL FLUID

[75] Inventors: Nobuaki Nakajima; Seiji Yasuhara; Mamoru Ishihara, all of Hiratsuka, Japan

[73] Assignee: Sumitomo Heavy Industries, Ltd., Kanagawa, Japan

[21] Appl. No.: 812,986

[22] Filed: Dec. 24, 1985

[30] Foreign Application Priority Data

Dec. 26, 1984 [JP] Japan .................................. 59-273488

[51] Int. Cl.$^4$ ............................................. C04B 35/64
[52] U.S. Cl. ......................................... 264/37; 260/705;
264/28; 264/40.1; 264/43; 264/63; 264/85;
264/344; 428/688
[58] Field of Search ...................... 264/37, 42, 43, 28,
264/63, 85, 344, 44, 64, 65, 66, 40.1; 427/255.1;
428/688; 260/705

[56] References Cited

U.S. PATENT DOCUMENTS

| | | | |
|---|---|---|---|
| 3,351,688 | 11/1967 | Kingery et al. | 264/63 |
| 3,442,668 | 5/1969 | Fenerty et al. | 264/63 X |
| 4,011,291 | 3/1977 | Curry | 264/43 |
| 4,404,166 | 9/1983 | Wiech, Jr. | 264/42 X |
| 4,552,786 | 11/1985 | Berneburg et al. | 427/255.1 X |

*Primary Examiner*—Jeffery Thurlow
*Assistant Examiner*—Leo B. Tentoni
*Attorney, Agent, or Firm*—Stewart L. Gitler; Martin P. Hoffman; Mitchell B. Wasson

[57] ABSTRACT

The invention relates to a method of removing binder materials from a shaped preform (green body) in the preparation procedure for the manufacture of ceramics from particulate materials. The new method comprises exposing the green body to a supercritical fluid to dissolve the binder materials in the supercritical fluid without deforming the shape of the article. In the method, the binder materials can be removed without swelling of the article because the green body is not exposed to a rapid temperature increase and the binder does not volatilize in the body. In addition, the binder material can be removed in a drastically shorter period of time from the entire body.

16 Claims, 2 Drawing Figures

FIG. 2
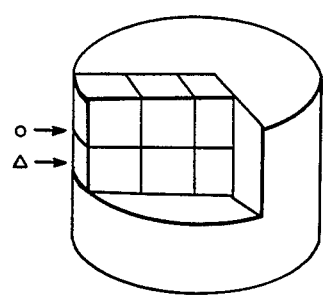
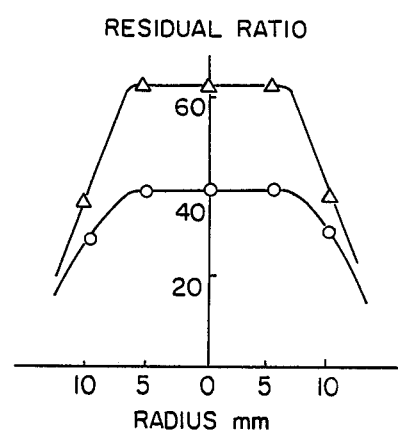
FIG. 2A.

METHOD OF REMOVING BINDER MATERIAL FROM A SHAPED CERAMIC PREFORM BY EXTRACTING WITH SUPERCRITICAL FLUID

FIELD OF THE INVENTION

The present invention relates to a method of removing a binder material from a preform in pre-sintering preparation of ceramics before sintering the shaped preform. Particularly it relates to a method of removing efficiently binder material from the preform body in the preparation step before sintering the shaped preform comprising refractory (heat resistant) particulate material and binder material.

The term "preform" herein is used to describe a shaped bod formed from particulate raw material such as ceramic raw material, for example, metal powder, metal oxide powder, refractory particulate material, such as nitrides, carbides, and the mixture thereof, by an appropriate forming techniques such as moulding, compressing, injection and extruding in a pre-sintering preparation for the production of ceramic material in the desired shape. The preform can be said to be the shaped "green" ceramic material and must be fired in a kiln or a furnace in the neighbourhood of any temperature which would ensure to develop sintering the grains of the desired ceramic material.

The preform must be formed by containing small amount of binder material(s) other than the particulate raw material, because the use of only raw powder can not form into a certain shape of the body and the addition of binder material(s) to the raw powder can impart some formability of the powder, that can be considered to be by imparting smoothness among the material particles and some rigidity to the formed body.

DESCRIPTION OF THE PRIOR ART

In the production of ceramics from refractory particulate materials, the particulate raw material must be formed into a preform of a given shape, for example, injection moulding or extrusion or press into the shaped preform, then the so prepared preform must be sintered to produce ceramics of the given shape. In those pre-sintering preparation procedures, generally, binder material(s) in an amount of order of 5 to 30 weight % is added to particulate raw materials so as to impart plasticity to the particulate materials and further to impart strength to the shaped preform.

When the preform is fired as it is, the binder contained in the preform will rapidly vaporize to somehow expand the preform and/or deform same. As a result, all fired products would be substandard. Therefore, binder materials must be removed (defat), before sintering a preform. There have been practiced various processes for the removal of the binder materials; for example, the process comprising increasing the temperature very slowly under the atmospheric pressure, the process comprising putting the preform in an atmosphere of reduced pressure with increasing the temperature very slowly, and the process comprising contacting with an inert gas passing by the preform together with increasing the temperature very slowly.

However, when the removal (defat) of the binder materials is carried out in short period of time, the preform is affected by expansion or gasification of the binder materials to generate deformation such as fracture, swelling, and bending. Therefore, an extremely long period of time (several days) is necessary in the conventional slow removal of the binder. This is significant particularly to the preform containing the binder in a greater amount, and further to the thick preform. Therefore, there are found many problems particularly in much long period for defat, less treatment quantity and higher energy cost.

SUMMARY OF THE INVENTION

The inventors have been investigating on research of efficient removal of binder materials from the formed preform to be used for the production of ceramics and at last developed a process of effectively removing the binder materials from the preform in a relatively short period and further found that the binder that has been removed can be re utilized or recycled by the inventive process.

It is an object of the present invention to provide a method capable of efficiently removing the binder materials from the preform in the pre sintering preparation for the production of ceramics of the given shape.

It is another object of the invention to provide a process of removing the binder material from the preform in a relatively shorter period of time in the pre sintering preparation.

It is a further object of the invention to provide a system of recycling the binder materials in the forming of the preform and the removal of the binder materials from the preform for the pre-sintering preparation procedure of the production for refractory ceramic material.

The foregoing and other objects of the present invention can be attained by the following description.

BRIEF DESCRIPTION OF THE DRAWINGS

FIG. 2 shows a graph indicating the distribution of the residual binder material, and a view of the preform in partial section to indicate the measuring position.

DETAILED DESCRIPTION OF PREFERRED EMBODIMENTS

Figure 1:
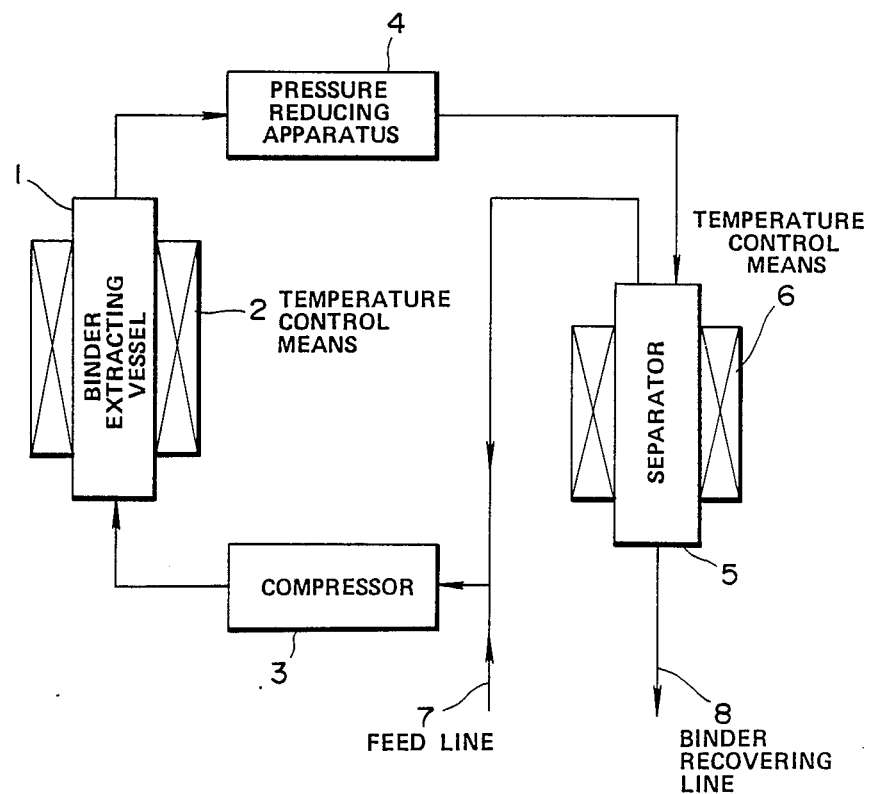
FIG. 1 is a schematic view of one embodiment of system for carrying out the present invention.

In accordance with the present invention, the novel process for removing binder materials from the preform to be used for the production of shaped ceramics is illustrated and applied to the method of the production of ceramics in the given shape and ceramics product produced thereby.

After intensive research of efficient process of making ceramic material from particulate raw material, the inventors developed the efficient removal of binder materials from the preform in the pre-sintering preparation for the production of ceramic material in the desired shape. The efficient process which the inventors have developed for removing binder material(s) from the preform in a pre-sintering preparation for the production of ceramics in a given shape comprises exposing the preform comprising refractory particulate material(s) and binder material(s) in a given shape, to fluid in the supercritical state thereby to dissolve binder materials in the supercritical fluid; discharging the fluid from a vessel under supercritical condition; and recovering binder materials from the fluid by reducing the pressure to the fluid or elevating the temperature of the fluid thereby to recycle the binder materials and fluid for further use thereof.

The basic concept of "supercritical fluid extraction" is described for example in 'P. F. M. Paul, et al; "The Principles of Gas Extraction" M&B Monograph CE/5, Mills and Boon, London, 1971' and at 'N. Gangoli, et al. Ind. Eng. Chem. Prod. Res. Dev., 16, (3) 208 (1977)'.

The supercritical fluid extraction utilizes the solvent power of the fluid under the supercritical condition, in the other words, the supercritical fluid extraction is a separation method utilizing the elevation of the vapor pressure of the substance in the presence of the supercritical fluid as well as the difference of chemical affinities.

The ability of the supercritical fluid to function as a solvent is greatly dependent on its density increase. The density of the fluid under the supercritical condition is much higher than that of the gaseous fluid under ambient temperature and atmospheric pressure and is competitive to that under the liquidized state. Such increase of the density will elevate the affinity with the solute so as to accelerate the solvent power of the fluid so that it functions as a separator so effectively.

When the pressure is extremely high, the solubility in the supercritical fluid of the substance to be extracted will highly increase with the increase to the temperature of the supercritical fluid. This effect is caused because the increase of the vapor pressure of the substance to be extracted is more significant than the decrease of the density of the supercritical fluid by the increase of the temperature. On the contrary, when the pressure is not so high, the solubility will decrease with the increase of the temperature. In this case, the density of the supercritical fluid is significantly decreasing, whereas the vapor pressure of the substance to be extracted is slightly increasing.

The substance being extracted is solute in the supercritical fluid under the supercritical condition. Such substance can be easily separated from the fluid, and easily recovered. The separation can be easily carried out by reducing the pressure at the constant temperature, or elevating the temperature at the constant pressure.

In accordance with the present invention, the fluid should have the critical temperature near the operation temperature, but the critical temperature may be lower than the operation temperature. Generally, because the extraction is carried out under the room temperature, the fluid should have the critical point above 0° C., and be gaseous at 0° C.

The binder materials should have two functions; one is to impart binding strength to the preform when the particulate material is compressed with binder materials into the preform, and the other is to impart the lubricity or lubricating action when the preform is being formed by injection moulding or extrusion or press.

The binder materials used commonly may be organic materials such as higher alcohols, higher fatty acid, higher hydrocarbons, polymer or resin.

The refractory particulate material used in the present invention may include metal powder, metal oxide powder, ceramic materials, such as nitrides, carbides, boronitrides, carbonitrides, and the mixture thereof.

The binder materials may include solid materials under ambient temperature, such as higher alcohols (for example octadecanol), fatty acids (for example stearic acid), wax, polyethylene and the like.

The fluid used in the present invention, whih can be kept in a supercritical state, may be a gas under ambient temperature and ambient pressure, the critical temperature of which is higher than 0° C. The fluid may be selected from the group consisting of $CO_2$, and FREON ® (chlorofluorocarbons) gas and the mixture thereof.

In reference to the drawings, the present invention will be further illustrated in the following description.

The inventive process comprises two major steps of (1) exposing a preform to the fluid in a supercritical state thereby to remove the binder materials from the preform, and (2) isolating binder materials from the fluid so as to recover binder material for further recycling.

The preform is put in the binder extracting vessel 1, and then the fluid (for example, $CO_2$, and FREON ® (chlorofluorocarbons),) compressed at the pressure higher than the critical pressure by a compressor, 3 is fed in the vessel 1. A temperature control means 2 maintains the temperature in the vessel 1 higher than the critical temperature. The preform is exposed to the fluid kept under the supercritical state in the vessel 1 (the supercritical fluid) so as to dissolve the binder materials from the preform into the supercritical fluid.

The supercritical fluid in which binder materials are dissolved is transferred through a pressure reducing apparatus 4 to a separator 5 having a temperature control means 6 where the density of the fluid will be reduced so as to loose a dissolving power and to isolate the binder materials from the fluid in a separator 5. The binder materials are continuously recovered from the line 8, and the recovered binder materials can be reutilized for forming a preform.

On the other hand, the fluid isolated in the vessel 5 is fed into the compressor 3 to enable recycling. The supplementary feed is provided through a line 7.

In accordance with the present invention, the fluid kept in the supercritical state exhibits an extracting power by increase of density of the fluid enabling to dissolve and remove the binder material. In this process, the binder material will not expand the preform body nor evaporate in the preform, which materials are dissolved into the supercritical fluid, resulting in substantially neither deformation nor defects in the preform.

In accordance with the present invention, the fluid for extraction of binder materials is present under the condition above the critical pressure and above the critical temperature, because it becomes so densified to dissolve the binder materials and remove them from the preform which is exposed to the fluid, when it is under the supercritical state.

However, the fluid should be at the temperature lower than the decomposition temperature of the binder, because it cannot be recovered nor recycled when it is at above the decomposition temperature. Further, the operation temperature should be lower than the composition temperature of the binder materials.

Since the supercritical fluid has a higher diffusion coefficient but a lower viscosity, it can penetrate quickly into the inside of the preform, and dissolve the binder materials into the fluid for extracting the materials.

In the conventional process for removal of the binder materials by burning the materials, the binder materials are gasified, and therefore, the phase change of solid to gas occurs to produce some expansion in the preform, that can easily generate some deformation or defects in the preform. On the other hand, any phase change or volumetric change will not be generated where the binder materials can be extracted and removed by the supercritical fluid from the preform without any defects found in the preform.

In accordance with the present invention, the binder materials are substantially uniformly removed along the entire surfaces from the entire body of the preform as shown in FIG. 2. The graph in FIG. 2 demonstrates that the uniform substantial extraction of the binder materials eliminates deformation in the preform.

The inventors have confirmed that in accordance with the present invention, $CO_2$, and Freon-12 can extract the following groups of binder materials;

pressed in a small size liquid pressure press to the pressure of 700 Kg/cm$^2$, into a moulding of preform. The moulding of preform was exposed to $CO_2$ or FREON ®12 (chlorofluorocarbon) (Dichlorodifluoromethane) in supercritical state so as to remove the binder materials.

The conditions and results thereof are shown in Table 1.

The critical point of $CO_2$ fluid is at the critical temperature of 31° C., and at the critical pressure of 72.8 atm. The critical point of Freon 12 is at 112° C., and 40.7 atm.

TABLE 1

| No. | Binder Fluid | Temp. °C. | Pressre Kg/cm$^2$G | Weight of Green body g | Flow Rate l/min | Removal of Binder % | Exposure Period Hrs. |
|---|---|---|---|---|---|---|---|
| 1 | Octadecanol $CO_2$ | 100 | 65 | 10.07 | 191 | 0.2 | 2.1 |
| 2 | Octadecanol $CO_2$ | 45 | 200 | 11.32 | 200 | 70.3 | 2.2 |
| 3 | Octadecanol Freon ® (chlorofluorocarbon) 12 | 120 | 120 | 11.69 | 260 | 94.7 | 2.8 |
| 4 | Stearic acid $CO_2$ | 45 | 200 | 10.35 | 235 | 85.0 | 2.5 |
| 5 | Stearic acid Freon ® (fluorocarbon) 12 | 120 | 120 | 10.06 | 64 | 99.0 | 0.7 |

1. higher alcohol (such as octadecanol);
2. organic fatty acid (such as stearic acid);
3. wax (such as paraffin).

Therefore, the binder materials comprising as a major component the above mentioned binder materials can be surely removed by the claimed process. However, it is to be noted that the claimed process can be applied to the other binder materials. The inventors found that polymeric materials (resin) are difficult to extract, but the polymeric binder materials can be as a minor component contained in the shaped preform to the extent that they do not affect to the sintering step. In view of convenience of handling the preform in the subsequent steps, it is better to retain some of the binder materials in the preform, rather than completely removing of the binder materials.

In accordance with the present invention, the exposure of the preform to the supercritical fluid to remove binder materials can reduce drastically the necessary period of time for removing binder materials from the preform, and further, enables the recovery of the binder materials for recycling. Further, the fluid isolated can be recycled to the compressor 3. Therefore, as shown in FIG. 1, the system utilizing the inventive process can be considered to be an approximation to a closed circuit.

In view of the foregoing, the inventive process can reduce the cost of energy, and therefore, is more economical and saves materials and energy. It can be said that the inventors found an extremely efficient process for removal of binder materials from the preform.

The following examples illustrate the practice of the invention, but should not be interpreted as limiting the scope and application.

EXAMPLE 1

15 Weight parts of binder (octadecanol or stearic acid) was added to 100 weight parts of alumina (having grain size of 1 to 10 μm), and mixed. The mixture was In Table 1, No. 1 was not in the supercritical state and therefore, the media was in a gas state, so that the removal of the binder materials could be effected only by the vapor pressure of the binder material. The result shows that most of the binder material could not be removed from the preform. Embodiments of Nos. 2 to 5 are within the scope of the claimed invention. In those examples, the preforms were exposed to the fluids in a supercritical state, and therefore, the results indicate that the removal of binder materials was increased without any deformation of the preform.

There is shown that there was found somehow difference in the efficiency to remove the binder material and the periods for removal among examples of Nos. 2 to 5. Those results are not limitative, for when the flow rate of the fluids is increased, the removal of the binder material can be improved, and the period for removal can be decreased.

EXAMPLE 2

Various organic materials were added to alumina powder and mixed, and the mixtures of the particulate materials were injected into a preform in a given shape. The shaped preforms were exposed to $CO_2$ in a supercritical state to remove the binder materials from the preform. The results are shown in Table 2.

When injection moulding is used for forming of the preform in a given shape, a variety of binder materials are used often in combination thereof under consideration of fluidability, formability and demouldability characteristics, and further, more amounts of binder materials are frequently used, and therefore, the removal by pyrolysis needs longer period of time.

There was found that such injected preform could be treated in much shorter period such as about 30 minutes to 3 hours for removal of binder materials by exposing to the fluid in a supercritical state, and any deformation of the preform could not be found.

TABLE 2

| No. Preform | Fluid | Temp. °C. | Pressure Kg/cm$^2$G | Weight of Green body g | Flow Rate l/min | Removal of Binder % | Exposure Period Hrs. |
|---|---|---|---|---|---|---|---|
| 6 Al$_2$O$_3$:100 stearyl alcohol:18 | $CO_2$ | 60 | 200 | 9.14 | 40 | 91.0 | 0.5 |
| 7 Al$_2$O$_3$:100 stearyl alcohol:15 | $CO_2$ | 85 | 200 | 10.11 | 210 | 71.4 | 2.2 |

TABLE 2-continued

| No. Preform | Fluid | Temp. °C. | Pressure Kg/cm²G | Weight of Green body g | Flow Rate l/min | Removal of Binder % | Exposure Period Hrs. |
|---|---|---|---|---|---|---|---|
| 8 Al₂O₃:100 paraffin 155:12 stearic acid:2 DEP: 1 | $CO_2$ | 70 | 200 | 9.60 | 300 | 78.0 | 3.0 |
| 9 Al₂O₃:100 stearic acid:2 stearyl alcohol:8 paraffin155:8 | $CO_2$ | 45 | 200 | 10.05 | 270 | 70.0 | 2.8 |
| 10 Al₂O₃:100 stearic acid:2 stearyl alcohol: 10 seratic :6 | $CO_2$ | 60 | 200 | 10.59 | 150 | 83.0 | 1.5 |

What is claimed is:

1. A process for removing binder material(s) from a preform in a prefiring preparation for the production of ceramics in a given shape, which comprises the steps of:
    (a) exposing a preform comprising refractory particulate material(s) and binder material(s) to a supercritical fluid which is gaseous under ambient pressure and ambient temperature thereby dissolving the binder material(s) in the fluid;
    (b) discharging the fluid from a vessel under supercritical condition; and
    (c) isolating the binder materials from the fluid by decreasing the density of the fluid thereby to recover the binder materials and fluid for further use thereof.

2. A process for removing binder material(s) from a preform in a preparation for the production of ceramics in a given shape as claimed in claim 1, wherein said density of said fluid is decreased by controlling the pressure or the temperature of the fluid.

3. The process as claimed in claim 2, wherein the fluid is a gas under ambient temperature and atmospheric pressure.

4. The process as claimed in claim 3, wherein the fluid is a gas under the condition at 0° C. and atmospheric pressure.

5. The process as claimed in claim 4, wherein the fluid is a gas from the group consisting of $CO_2$, and chlorofluorocarbon type.

6. The process as claimed in claim 4, wherein said binder material(s) component(s) to be extracted are selected from the group consisting of higher alcohol, organic fatty acid, higher hydrocarbons, polyethylene and the combination thereof.

7. The process as claimed in claim 4, wherein said binder material component(s) to be extracted are selected from the group consisting of higher alcohol, organic fatty acid, wax and the combination thereof.

8. The process as claimed in claim 1, wherein said preform in the step (a) is exposed to the supercritical fluid maintained under the condition where the temperature thereof ranges from the critical temperature of the used fluid to 120° C. and the pressure therein is higher than about 2.7 times that of the critical pressure of the used fluid, so as to dissolve the binder material in the supercritical fluid.

9. The process as claimed in claim 6, wherein said preform is exposed to the supercritical fluid maintained under the condition where the temperature thereof ranges from the critical temperature to 120° C. and the pressure therein is higher than about 2.7 times that of the critical pressure of the used fluid, so as to dissolve the binder materials in the supercritical fluid.

10. The method for the production of ceramics in a given shape, as claimed in claim 1, wherein said supercritical condition in the step (b) is maintained where the temperature thereof ranges from the critical temperature of the used fluid to 120° C. and the pressure therein is higher than about 2.7 times that of the critical pressure of the used fluid, so as to dissolve the binder materials in the supercritical fluid.

11. A method for the production of ceramics in a given shape, which comprises the steps of:
    (a) forming a preform in a given shape from refractory particulate materials and binder material(s) in controlled amount;
    (b) removing said binder material(s) from the preform by exposing the preform comprising the refractory particulate material and binder material(s) in a given shape, to a supercritical fluid, the substance of which is gaseous under the ambient pressure and the ambient temperature thereby to dissolve binder materials in the fluid;
    (c) discharging the fluid from a vessel under supercritical conditions;
    (d) isolating the binder materials from the fluid by controlling the pressure or the temperature of the fluid thereby to recover the binder materials and fluid for further use thereof; and then,
    (e) sintering the resulting preform into ceramics in the given shape.

12. The method for the production of ceramics in a given shape, as claimed in claim 11, wherein the fluid is a gas selected from the group consisting of $CO_2$, and chlorofluorocarbon type gas.

13. A method of producing an article from a fired particulate configuration whereby binder material is removed from the particulate configuration prior to firing without deformation of the configuration prior to the firing thereof, comprising the steps of:
    (a) mixing together predetermined amounts of sinterable particulate material and binder whereby said binder covers substantially all of the surface of the particles of said particulate material;
    (b) forming said mixture into a desired configuration;
    (c) exposing said configuration to a supercritical fluid, the substance of which is gaseous under the ambient pressure and the ambient temperature whereby to dissolve and binder materials into the fluid;
    (d) isolating the binder materials from the fluid by controlling the pressure or the temperature of the fluid thereby to recover the binder materials and fluid for further use thereof, and then, (e) sintering said formed configuration.

14. The method as claimed in claim 13, wherein said configuration in the step (c) is exposed to the supercritical fluid maintained under the condition whereby the temperature thereof ranges from the critical temperature of the used fluid to 120° C. and the pressure therein is higher than about 2.7 times that of the critical pressure of the used fluid, so as to dissolve the binder materials in the supercritical fluid.

15. The method as claimed in claim 14, wherein the fluid is a gas selected from the group consisting of $CO_2$, and chlorofluorocarbon type gas.

16. The method as claimed in claim 15, wherein the binder materials components to be extracted are selected from the group consisting of higher alcohol, organic fatty acid, wax and the combination thereof.

* * * * *